No. 638,673. Patented Dec. 5, 1899.
F. H. RICHARDS.
WEIGHING MACHINE.
(Application filed Sept. 9, 1898.)
(No Model.) 6 Sheets—Sheet 1.

Fig. 1.

Inventor:
F. H. Richards,
Witnesses;
R. W. Pittman.
Fred. J. Dole.

No. 638,673. Patented Dec. 5, 1899.
F. H. RICHARDS.
WEIGHING MACHINE.
(Application filed Sept. 9, 1898.)

(No Model.) 6 Sheets—Sheet 2.

Fig. 2.

Witnesses:
R.W. Pittman
Fred. J. Dole.

Inventor:
F.H. Richards.

No. 638,673. Patented Dec. 5, 1899.
F. H. RICHARDS.
WEIGHING MACHINE.
(Application filed Sept. 9, 1898.)
(No Model.) 6 Sheets—Sheet 4.

Fig. 4.

Witnesses:
R. W. Pittman
Fred. J. Dole.

Inventor:
F. H. Richards

No. 638,673. Patented Dec. 5, 1899.
F. H. RICHARDS.
WEIGHING MACHINE.
(Application filed Sept. 9, 1898.)

(No Model.) 6 Sheets—Sheet 5.

Fig. 5.

Witnesses:
R. W. Pittman
Fred. J. Dole.

Inventor:
F. H. Richards.

No. 638,673. Patented Dec. 5, 1899.
F. H. RICHARDS.
WEIGHING MACHINE.
(Application filed Sept. 9, 1898.)
(No Model.) 6 Sheets—Sheet 6.

Witnesses:
R. W. Pittman
Fred. J. Dole

Inventor:
F. H. Richards

UNITED STATES PATENT OFFICE.

FRANCIS H. RICHARDS, OF HARTFORD, CONNECTICUT, ASSIGNOR, BY MESNE ASSIGNMENTS, TO THE NEW ENGLAND AUTOMATIC WEIGHING MACHINE COMPANY, OF PORTLAND, MAINE.

WEIGHING-MACHINE.

SPECIFICATION forming part of Letters Patent No. 638,673, dated December 5, 1899.

Application filed September 9, 1898. Serial No. 690,574. (No model.)

*To all whom it may concern:*

Be it known that I, FRANCIS H. RICHARDS, a citizen of the United States, residing in Hartford, in the county of Hartford and State of Connecticut, have invented certain new and useful Improvements in Rising-Poise Weighing-Machines, of which the following is a specification.

This invention relates to weighing-machines, and more particularly relates to that class thereof designated as "rising-poise" weighing-machines.

An object of the invention is to provide an improved organization of mechanisms, including weighing mechanism embodying a fluid-displacing counterbalancing means and also including improved load-reducing means.

Another object of the invention is to provide a load-reducing means involving the use of a flowable substance or stream applied, for instance, in one mode thereof in the form of a blast effective to reduce the material or overload supplied to the weighing instrumentality or mechanism.

A further object of the invention is to provide a load-reducing means which is supported independently of the weighing instrumentality or mechanism and is operative to feed, convey, or discharge a part of the material away from said weighing mechanism, whereby the use of a load-reducing means carried by or supported on said weighing mechanism is dispensed with, so that the mechanism for effecting the operation of such load-reducing means may be simplified, while at the same time an efficient load-reducing means, which may be positive in its action, obtained.

A still further object of the invention is to provide a load-reducing means which is effective on the material while a part thereof is without the field of influence on the weighing instrumentality or mechanism and during its discharge into such field of influence—in other words, while such material is in transit, but has passed entirely from the load-receiver and has no influence on the weighing mechanism.

In my prior "rising-poise" patents, including my first patent, No. 572,067, dated November 24, 1896, the overload or the amount of material supplied to the receiver has been usually reduced by means operative directly on such material while in the receiver and which load-reducing means has, moreover, when effective to discharge, convey, or feed a part of the material away from the receiver, been supported on or carried by the weighing mechanism. In the present instance, however, the load-reducing means is effective on the material in an improved mode after it has been completely transferred or discharged from the weighing mechanism or the receiver thereof and while it is in space, and is consequently without influence on such mechanism.

In the drawings accompanying and forming part of this specification, Figure 1, which illustrates this invention by one form of mechanism, is a front view of a weighing-machine constructed in accordance with said invention, a part of the base of the machine being broken away and a part shown in section to more clearly illustrate the structure of the apparatus.

Similar characters of reference designate corresponding parts in the different figures of the drawings.

As a preface to a further description of this improved rising-poise weighing-machine it is to be understood that the various details herein shown and described may be more or less varied without departing from the general scope of the invention. For instance, various stream-controlling means or load-receiver counterbalancing means may be adapted for use in connection with the other mechanisms shown and described, the invention more particularly comprehending a load-reducing device, instrumentality, or means involving the use of a flowable substance or fluid applied, in the particular device shown herein, in the form of a blast or a load-reducing device which is supported independently of the weighing mechanism and operative to feed, convey, or discharge the material away therefrom or a load-reducing means operative on the material while in a neutral space and shown herein immediately on its passage thereinto and while it is without the region or field of influence on the weighing mechanism, and it will be understood that the blast may be composed of any suitable matter or medium, fluid or otherwise, found suitable or desirable for the particular material to be acted upon, so that, for instance, in those weighing-machines operative to weigh or control a fluid the reduction may be effected by the action of one fluid upon another. Furthermore, it will be understood that the load-reducing means may be thrown into and out of action at any desired stage in the operation of the machine by merely changing the time of operation thereof, and hence the load-reducing means may operate simultaneously with the supply of material to the load-receiver, if found desirable—as, for instance, the amount of reduction may be somewhat less than the amount of supply, so that a gradual making up of the overload is obtained, or after a certain proportion of the material has been supplied to the receiver the reduction may be somewhat greater than the remaining supply, whereby the load is gradually brought to a poise; but for the present purposes the load-reducing means will be described as operative after the overload has been completely supplied and the further supply of material to the weighing mechanism cut off.

This improved machine comprises, in a general way and in the form thereof herein shown and described and which may be its preferred form, if desired, weighing mechanism (designated in a general way by A) shown herein comprising a load-receiver of any suitable construction and counterbalancing means comprising fluid-displacing means, load-reducing means (designated in a general way by B) involving the use of a blast and which may be carried independently of the weighing mechanism and may operate on a portion of the material after the same has completely left such weighing mechanism, and which weighing-machine will usually embody in practice load or overload supply means, (designated in a general way by C,) and stream-controlling means, such as valve mechanism, (designated in a general way by D,) for regulating the supply of material to the receiver, and which receiver may be provided with load-discharging means, (designated in a general way by E.)

In my prior weighing-machine patents interlocking means is shown intermediate the stream-controlling means and the load-discharging means for locking one closed or against operation while the other is open or in operation; but in the present construction the machine is so simplified that this locking means is dispensed with.

The framework for supporting the operative mechanisms may be of any suitable character; but in the present instance it is shown comprising a base 2, having a pair of uprights or side frames 3 and 4, united at the upper ends thereof by a top plate 5, shown carrying the material-supply means, such as a chute 6, of any suitable construction.

The weighing mechanism in the form shown and which may be its preferred form, if desired, comprises a suitable load-receiver 100, which in the present instance is shown having the reduction of the load effected at one side thereof while the discharge of the main or true load is effected at the opposite side thereof, and for this purpose the load-receiver is provided with an improved construction (more fully set forth hereinafter) for permitting the reduction of the load and terminates in a spout formation 7 to facilitate the discharge of the true load. This receiver is provided with load-discharging means, (shown in the present instance comprising a closer operative at the discharge end of said receiver.) In the form shown this closer comprises a weighted oscillatory closer 8, pivotally secured to the load-receiver, suitable means being provided for maintaining the same shut or closed. This means in the form shown comprises a weighted catch or locker 9, pivotally secured to one part of the load-receiver and having a working part 10 operative to engage an arm 8', carried by the closer, to maintain the same shut. The movement of this catch is limited by a stop 13, disposed intermediate a pair of stop-arms 12 and 12', projecting from the hub of said catch, whereby such closer-catch will be maintained in operative position. This catch 9 is also provided with an arm 14 in position to be engaged by a weighted by-pass 15, carried by one of the side frames, as 3, and maintained in operative position by stops 16, disposed intermediate a pair of stop-arms 17 and 17', carried by the hub of said by-pass. When the receiver descends with its overload, the catch descends therewith and carries its arm 14 into position below the by-pass 15, Fig. 4, whereupon when the receiver reaches its poising position with its true load said arm 14 is in position to be engaged by such by-pass, whereby it will be oscillated, the closer released, and the discharge of the load effected, such catch-arm 14 being released from the by-pass 15 when the receiver ascends to its normal position by the continued upward movement of said receiver.

The load-receiver counterbalancing means in the present instance comprises a fluid-displacing means, and for this purpose the base 2 is shown provided with a suitable tank 20, carrying fluid, such as water. Disposed within this tank, to which access may be had by means of a removable cover 21, is a float 200, hollow or otherwise, as desired, maintained in operative position by a pair of links 23, pivotally secured thereto and to one of the walls of said tank. This float is connected by a suitable connection, such as a pair of rods 24, with the load-receiver, and for this purpose said receiver is provided with a pair of socketed members 25, into which the upper ends of said rods project, being adjustably secured therein by fastening devices 26, the opposite ends of said rods being preferably threaded, whereby they may be secured in position in threaded sockets of the float. The descent and ascent of the load-receiver is determined or limited by suitable means, such as collars, one, as 27, shown fixedly secured to each rod 24 and the other, as 28, adjustably secured thereto, two below the cover of the tank and the others above it, whereby the engagement of the collars with said cover determines or limits the descending and ascending movement of the load-receiver. For the purpose of suitably guiding the rods the cover of the tank is shown provided with sleeves 29, each of somewhat larger diameter than its rod, whereby the free action of the weighing mechanism is not retarded by friction. Instead of the connection shown between the float and the load-receiver other means may be used for this purpose, or only one of the rods shown may be used.

The stream-controlling means, which may be considered as constituting a part of the load-supply means, in the form shown comprises an oscillatory valve 30 of any suitable construction, having its arms 31 pivotally secured one at each side of the supply-chute 6, and which supply-valve is controlled by the weighing mechanism through the medium of the load-receiver, and for this purpose and also for the purpose of guiding the load-receiver in its movements said receiver is shown provided with a pair of upwardly-extending arms 32, pivotally connected to a pair of oscillatory arms 33, pivotally connected in turn to the supply-chute, one at each side thereof.

For the purpose of preventing the downward movement of the receiver until an overload is assured one of the oscillatory arms 33 is provided with a friction-roll 34 in position to engage a cam device 35, pivotally secured to the supply-chute and maintained in position by a suitable adjustable weight 36 and a stop 37. This cam device is provided with two cam-surfaces 35' and 35'', so that when the load-receiver is in its normal position and until a certain amount of material has been received thereby, usually an overload, the weighted cam device has one of its surfaces, as 35', in engagement with the friction-roll 34 of the oscillatory arm, whereby said cam device, in connection with the counterbalancing means, prevents the descent of the load-receiver until an overload is assured, at which time the load-receiver descends, operating to draw the oscillatory arms 33 downward, thereby shifting the weight 36 upwardly, the return movement thereof being limited by the stop 37. On the return movement of the load-receiver to its normal load-receiving position the friction-roll engages the other cam-surface 35'' and shifts said cam device outwardly, and thereby the weight upwardly, to permit the oscillatory arm to move into position to engage the cam-surface 35'. Carried by each of the receiver-arms 32 is a working member 32', operative to engage a projection 31', carried by each of the valve-arms 31, whereby when the load-receiver is in its normal load-receiving position these working members 32' and projections 31' are in engagement and the valve maintained open, it being gradually opened on the upward movement of the receiver, owing to the engagement of said projections 31' with the working members 32'. On the descent of the load-receiver the working members 32' descend therewith and disengage the projections 31' of the valve, permitting the same to gradually close and cut off the supply of material to the load-receiver, the closing movement thereof being limited by a suitable stop 38, carried by the supply-chute 6.

Figure 1:
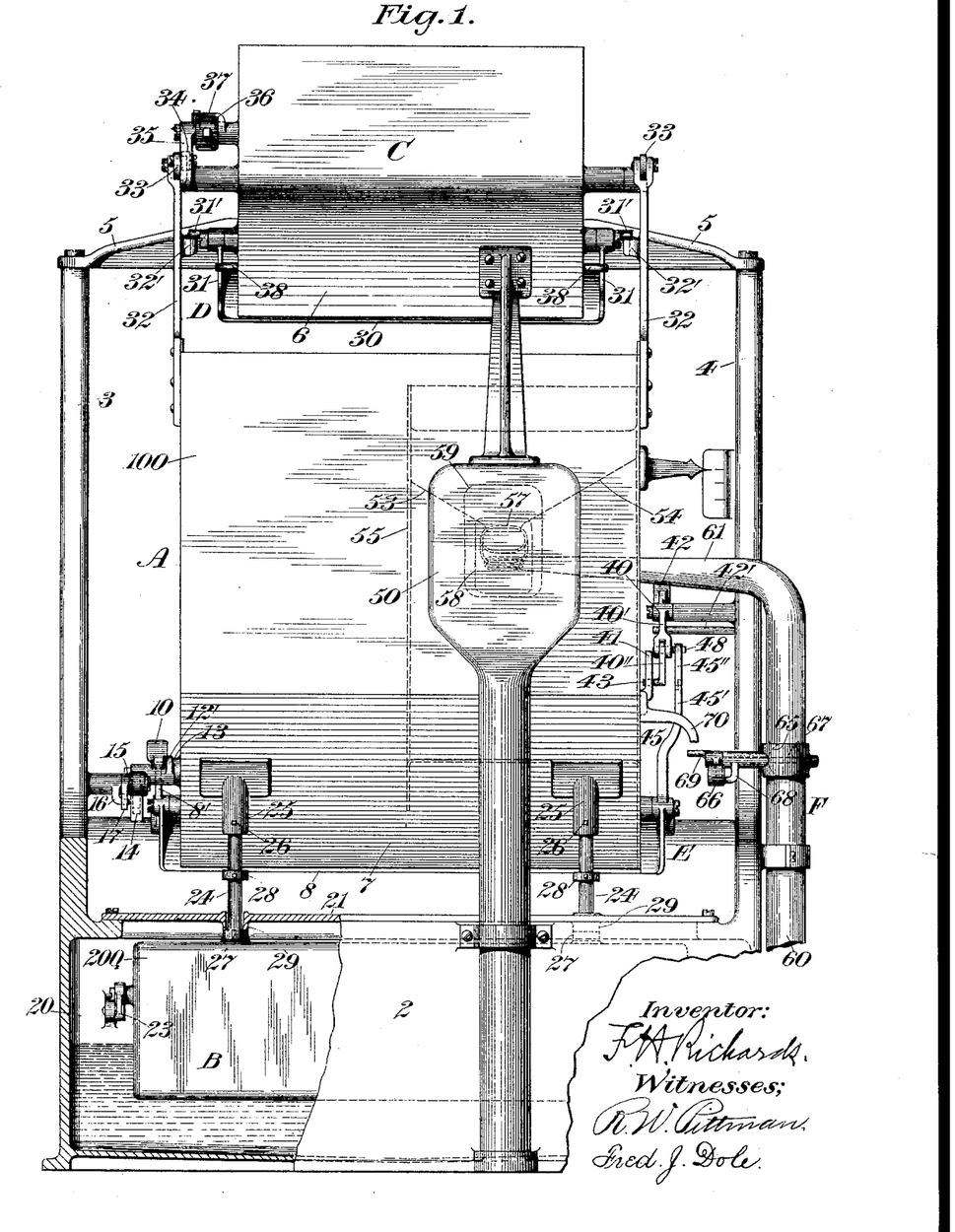
Figure 2:
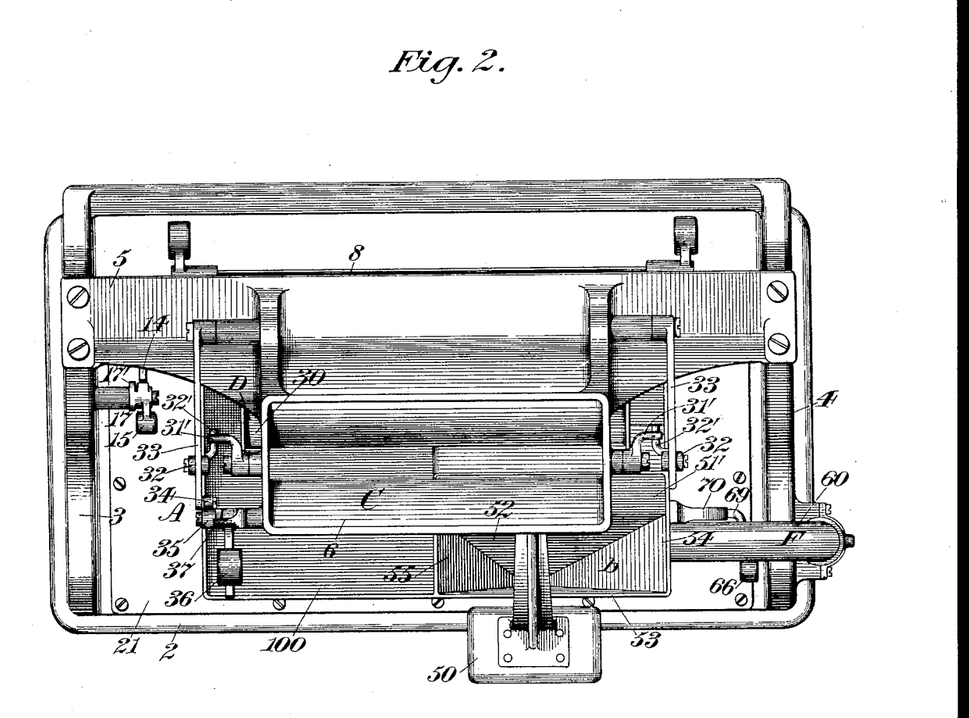
Fig. 2 is a top view of the same.
Figure 3:
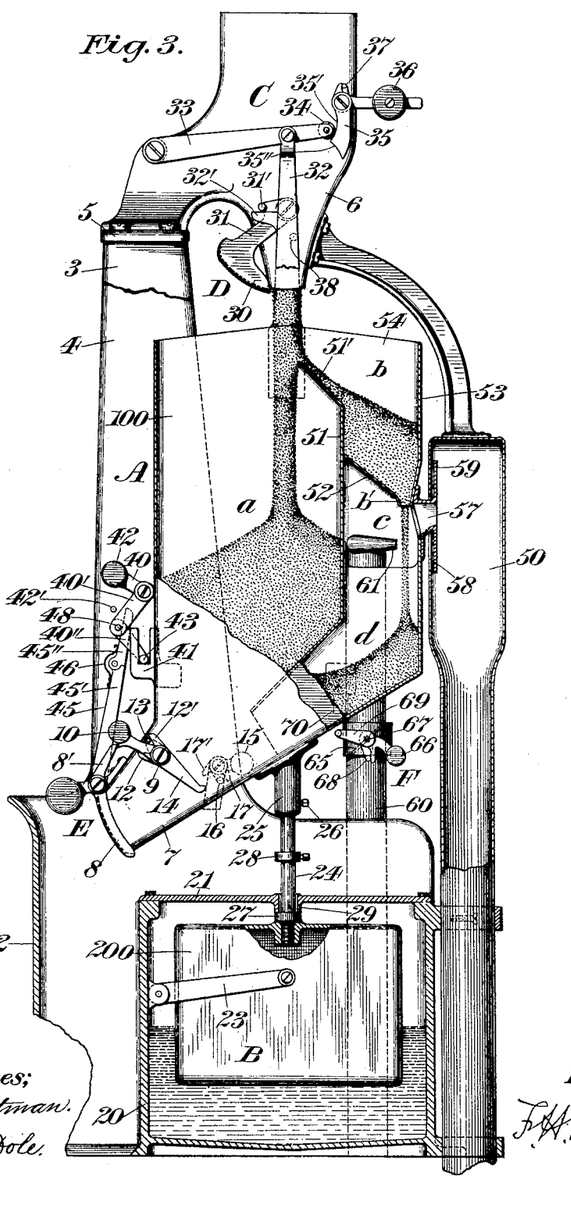
Figs. 3, 4, and 5 are right-hand side views thereof with parts thereof broken away and in section.
Figure 4:
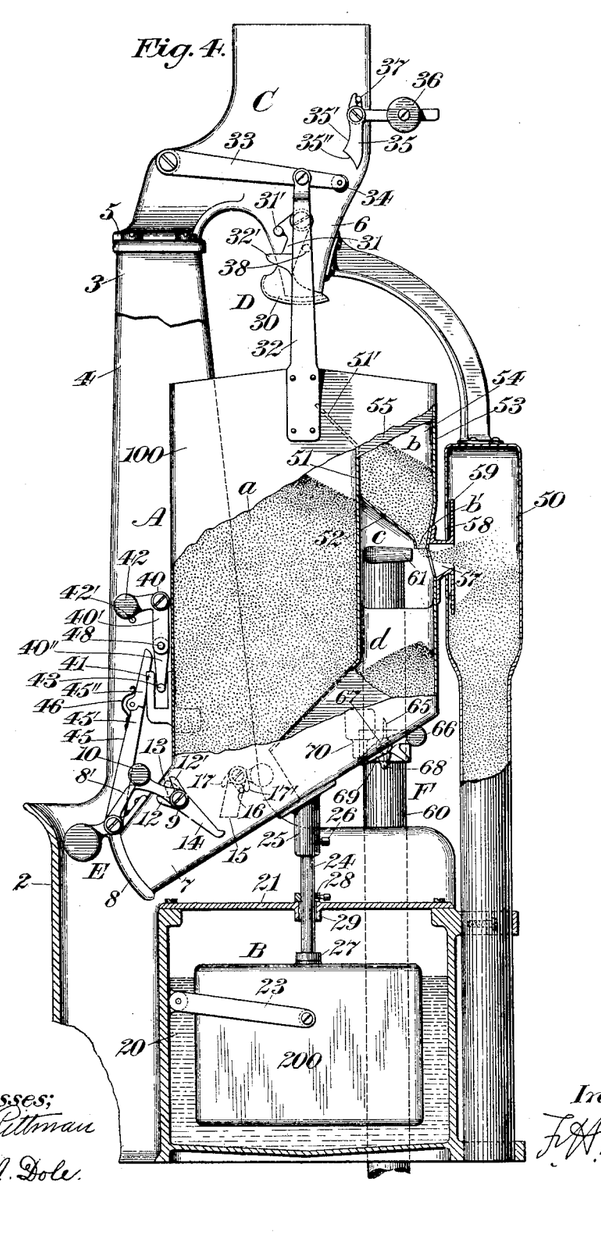
Figure 5:
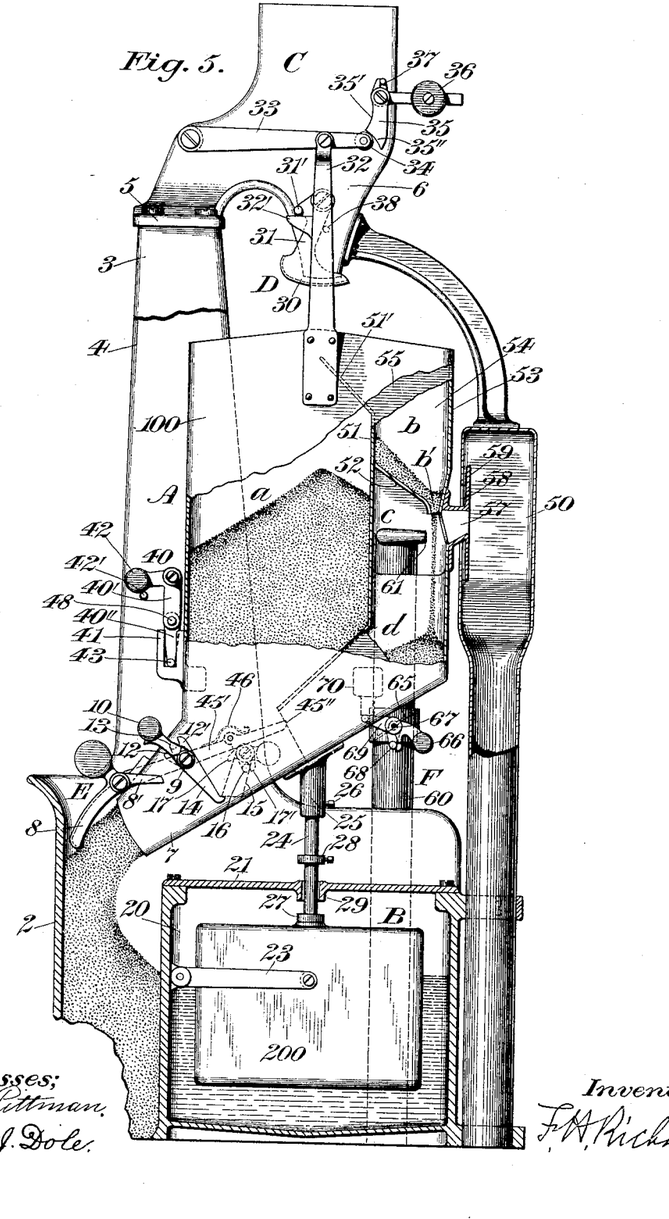
Figures 6, 7:
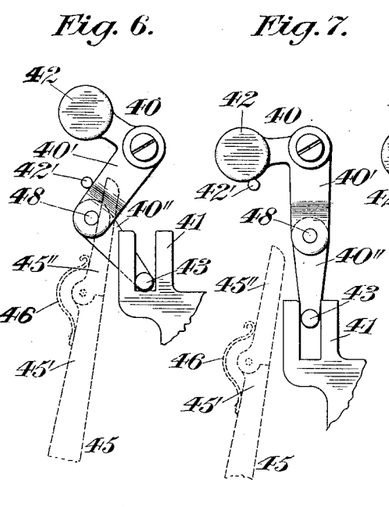
Figs. 6, 7, 8, and 9 are detail views of one means for preventing the operation or opening of the stream-controller or supply-valve during the ascent of the load-receiver to its poising position and before the complete discharge of the load from the receiver.
Figures 8, 9:
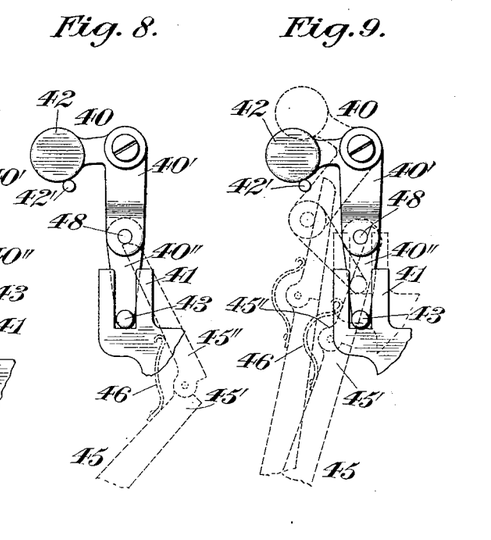
Figure 10:
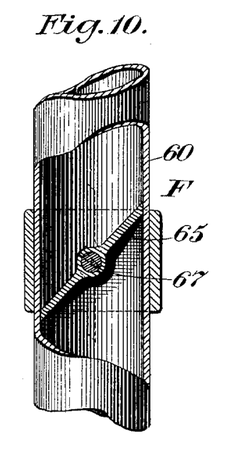
Figs. 10 and 11 are detail partly-sectional views of the load-reducing blast-controlling means.
Figure 11:
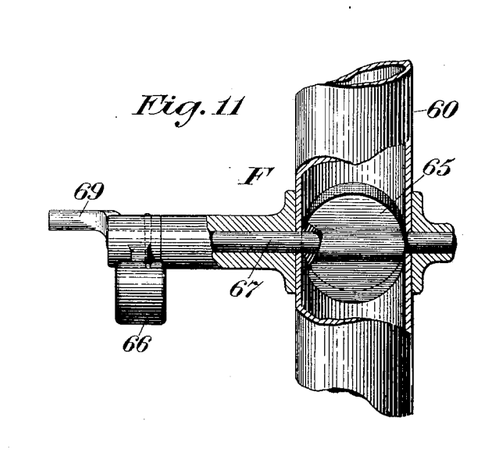

Since in this improved organization of mechanism the stream-controlling means is controlled by the weighing mechanism on the descent and ascent thereof, it follows that after the load-receiver has reached its poise position with its true load and has commenced its main discharge the tendency of the receiver is to return to its load-receiving position, and thereby open the valve and permit an additional stream of material to be supplied to the receiver at this time, which would be added to the true load already obtained. Therefore to prevent the opening of the valve except at the proper predetermined period improved means is provided, designated herein as "limiting means," since it permits the free downward movement of the receiver and the upward movement thereof to its poise position and also the return of such receiver to its load-receiving position after the load has been completely discharged, but limits the upward movement thereof from its poise to its load-receiving position, during which period the valve is opened until after the complete discharge of the true load. Heretofore the usual means for preventing the opening of the valve at this period consisted of interlocking means between the load-discharge closer and the valve, whereby on the opening of the former the valve was locked closed. In the present structure this interlocking means is completely done away with and the means for accomplishing this result is much simplified. In the form shown this means is operative to lock the receiver, and thereby the weighing mechanism, against upward movement during a predetermined period and prevent the opening of the valve, and involves, according to one construction thereof, toggle mechanism. This toggle mechanism comprises a toggle 40 and a working member or stop 41, coöperative therewith, one carried by the framework of the machine and the other by the receiver, and in the preferred construction this improved toggle 40 comprises a pair of toggle-levers 40' and 40'', pivotally secured to one of the side frames, as 4, and a weight 42, the movement of the weight in one direction being limited by a suitable stop 42'. The lower end of one of the toggle-levers, as 40'', is provided with a laterally-extending arm 43 in operative engagement with the working member 41, carried by the load-receiver. This member 41 is shown as a bifurcated device, in the furcated part of which the toggle-arm 43 is carried when the load-receiver is in its load-receiving position, whereby the toggle-levers are maintained in their angular position, substantially as shown in Fig. 3. On the descent of the load-receiver with an overload, however, the bifurcated member 41 descends therewith, thereby permitting the weight 42 to operate the toggle-levers and throw the same into alinement, substantially as shown in Fig. 4, so that when the true load has been partially discharged and the receiver commences to move upward above its position of poise the toggle-arm 43 engages the lower wall 41' of the bifurcated member 41, which thus acts as a stop and prevents such movement of the load-receiver, so that the opening of the valve is prevented. It will be understood, of course, that there is sufficient play between the bifurcated member 41 and the toggle 40 so as not to interfere with the proper poising of the weighing mechanism. To permit the load-receiver to return to its load-receiving position after the load has been completely discharged, suitable means is provided for operating this toggle mechanism so as to unlock the load-receiver and permit the ascent thereof, and in the present instance this means comprises a suitable actuating-arm 45, operatively connected to the closer 8, so that this toggle mechanism, which limits the movement of the load-receiver at one period, is in turn controlled by such load-receiver, constituting a part of the weighing or poising mechanism, through the medium of its closer. This arm 45 is shown comprising a pair of pivotally-connected members 45' and 45'', one of which is maintained in position relatively to the other by a suitable spring 46. In operation (see Figs. 6, 7, 8, and 9) when the load-receiver is in its load-receiving position the limiter-actuating arm 45 is substantially in the position indicated in Fig. 6, while the toggle-levers 40' and 40'' are in their angular position. On the descent of the load-receiver with its load this arm 45 is carried downwardly therewith, while the toggle-levers shift into alinement, Fig. 7, so that on the return of the load-receiver to its poising position and on the opening of the closer such closer shifts this actuating-arm 45 past the projection 43, carried by the toggle-levers, Fig. 8, this being permitted owing to the pivotal connection between the members 45' and 45'' of such arm, the member 45'' thereof being returned to its normal position by the spring 46 after it has passed the toggle members. On the shutting of the closer, the material maintaining it open until all appreciable amount thereof has been discharged, the actuating-arm is shifted upward, whereby it engages the projection 43 of the toggle-levers, Fig. 9, and forces the same into their angular position, substantially as shown in dotted lines, Fig. 9, thereby disengaging the same from the bifurcated member 41 of the load-receiver and permitting said receiver to ascend to its normal position, during which movement it opens the supply-valve in the manner above set forth to permit a succeeding load to be received by the weighing mechanism.

As before stated, this improved weighing-machine involves an improved load-reducing means operative to effect the reduction of the load at the proper predetermined period, thereby to secure a proper and true load in the manner set forth in my prior rising-poise patents, whereby the weighing mechanism is not affected by the impact of the material supplied thereto or by the momentum of the operating parts.

Heretofore in my rising-poise patents, as above set forth, the load-reducing means, strictly considered, usually either acts directly on the material within the receiver or permits the material in said receiver to flow out by gravity. In the present instance, however, I have provided a means which not only differs in operation from the load-reducing means heretofore described in my rising-poise patents, but a means which is operative on a portion of the material which has entirely left the load-receiver and is in space, but preferably during and immediately on its passage thereinto, and is consequently without the region of influence on said load-receiver, and which load-reducing means, moreover, need not be carried by any part of the weighing mechanism, as has usually been the case in my prior rising-poise patents.

To make the action of the load-reducing means effective in the form of machine shown herein, the load-receiver is provided with a plurality of compartments, one constituting the main load-receiving compartment (designated in a general way by $a$) and the other constituting a supplemental load-receiving compartment (designated in a general way by $b$) communicating with a neutral space or region, (designated in a general way by $c$,) and which space communicates in turn with the load-receiver by a suitable conduit or compartment (designated in a general way by $d$) and also communicates with the outside of the receptacle and preferably with a suitable conduit or stream-receiver 50, suitably supported by the framework and which may have therein suitable elevator means for conveying the material discharged thereinto to the supply-chute, if desired. To form these various compartments, the load-receiver is shown provided at one part thereof with a series of walls or partitions 51, 52, 53, and 54, forming, with the outer wall of the receiver, a chamber $b$, separate from the main load-receiving compartment $a$, but communicating therewith at its upper end, this communication being facilitated by an inclined apron or end 51' of the partition 51. The partitions 52, 53, and 54 are shown as inclined, thereby forming a hopper to facilitate the discharge of the material therefrom. This chamber $b$ terminates in a relatively small orifice or discharge-opening $b'$, communicating with a neutral space or region $c$, having no connection with and forming no part of the load-receiver, being separated from the main compartment $a$ thereof by the wall 51 and side wall 55, which at these points constitute to a certain extent the outer walls of the receiver, said neutral region opening at the opposite side to its side wall 55 at the outer side of the receiver and communicating at another part thereof with the conduit 50. Below this neutral space $c$ the receiver is provided with a conduit or compartment $d$, formed by a continuation of the partition 51 and wall 55 and one wall of the load-receiver, and which compartment $d$ communicates with said region $c$ and with the lower portion of the main compartment $a$ of the receiver, preferably terminating adjacent to the inner end of the spout 7 of said receiver, whereby the material discharged into said compartment $d$ is conveyed into position to be discharged from the receiver on the opening of the closer 8, the construction of such compartment or conduit $d$ being such that the material within the main compartment $a$ will not enter the lower end of said compartment to clog up the same. Adjacent to the discharge orifice or opening $b'$ of the supplemental compartment $b$ the receiver may be provided with a spout 57, which communicates with the neutral space $c$, and through which spout the material forming the overload is discharged in a relatively small stream, although the size of the stream may be regulated, if desired, by any suitable means, this spout preferably entering the discharge-conduit 50 hereinbefore described, and for this purpose said conduit has one of its walls provided with a relatively long opening 58 to permit the up-and-down movement of the spout 57 on the descent and ascent of the receiver, said spout being provided at its inner end with a closer or plate 59, adapted to overlap the edges of said opening 58, thereby to prevent the outflow of the material discharged into said conduit.

To reduce the load, an improved means is provided suitably supported in position for this purpose. In the present instance this means is shown as a blast-applying device (designated in a general way by F) comprising in the particular form shown a suitable conduit or pipe 60, leading from or in communication with any suitable blast-producing means and supported in position in any suitable manner, but shown herein as supported by one of the side frames, as 4, and having its discharge end 61 projecting into the neutral space $c$ intermediate the compartments $a$, $b$, and $d$. This discharge end 61 is provided with a spout located in position to have its fluid engage the stream of material discharged from the compartment $b$, thereby to force such material during the load-reducing period through the spout 57 and into the conduit 50.

It will be understood, of course, that the area of the neutral space $c$ is such that the proper up-and-down movement of the load-receiver is not impeded by the conduit-spout 62 projecting thereinto. This conduit 60 is, as above stated, connected with suitable means for producing the load-reducing medium, which medium is shown herein as a fluid, which may, for instance, comprise air, whereby during the load-reducing period, which, as hereinbefore stated, may be simultaneously with the supply or otherwise, the stream of material discharged from the compartment $b$, and which has entirely left the load-receiver and is without any influence thereon, will be forced laterally by the blast of air into the conduit 50, where it may be carried off or back to the supply-chute, if desired.

To control or regulate the blast, suitable means is provided, shown in the present instance controlled by the weighing mechanism, preferably by the load-receiver thereof, and which means comprises a balanced cut-off or valve 65, secured for oscillatory movement within the conduit 60 and normally held in position by a suitable weight 66, carried by a spindle or shaft 67, projecting through and journaled in the side walls of the conduit and to which said valve is secured, the downward movement of said weight being limited by a suitable stop 68. The valve-shaft is provided with a suitable arm 69, adapted to be engaged by a working member 70, secured in the present structure to the load-receiver, whereby on the descent of the load-receiver with its overload the valve will be oscillated to open the conduit and permit the blast of air to flow past such valve and engage the stream of material discharged from the chamber $b$ into the neutral space $c$, thereby to reduce the load, such valve being maintained open until the load has been reduced, determined by the poising of the weighing mechanism, whereby the upward movement of the load-receiver disengages the working member 70 from the valve-arm 69 and permits such valve to close by means of its weight 66 and cut off the blast of air, and consequently the reduction of the load.

From the foregoing it will be seen that the poising of the weighing mechanism, with its load, determines the period of operation of the load-reducing means and that by this improved load-reducing means the reduction can be effected with a relatively high degree of efficiency, and that, furthermore, the necessity of supporting the load-reducing means on the load-receiver or weighing mechanism is avoided, while the necessity of having such load-reducing means act directly on the material, whereby the poising operation may be interfered with, is also avoided in the present instance by having the load reduction effective on material which has passed without the realm of influence on the load-receiver. In the present machine it will, furthermore, be seen that the stream of material flowing from the compartment $b$ does not of itself reduce the load, since, if left unimpeded, it returns to the load-receiver to again form a part of the overload.

The operation of this improved weighing-machine, when constructed substantially in the manner shown and described, is as follows: The supply-valve being open and the receiver in its normal position, the material is supplied to the load-receiver, the main part thereof entering the main compartment $a$, a part being guided by the inclined wall $51'$ into the supplemental compartment $b$, from which it flows in a continuous stream through the neutral region $c$ and by the spout 57 of the receiver into the compartment $d$, where it again unites with the main load. After the overload has been secured the descent of the load-receiver permits the supply-valve to cut off the supply of material to the receiver, such descent operating to open the blast-valve and permit the blast of air to operate on the stream flowing from the compartment $b$ through the neutral region $c$, whereupon the reduction of the load takes place in the manner above set forth. On the poising of the load-receiver with its true load the closer is opened in the manner set forth, the receiver, however, being limited in its upward movement to prevent the opening of the supply-valve by the action of the weighing-mechanism limiter hereinbefore described. After the load has been completely discharged from the receiver the closer shuts, thereby operating the arm 45 into position to engage the limiter and actuate the same to permit the receiver to reascend to its normal position to receive another load.

From the foregoing it will be seen that this improved weighing-machine involves an improved load-reducing means whereby the use of a fluid is obtained for reducing the load, and therefore within the scope of this invention is considered and included any material-treating or load discharging or reducing means in which one form of matter, whether of a fluid nature or not, acts upon or intermingles with another like or dissimilar kind of matter to treat, discharge, or carry a part thereof away at any period in the operation of the machine, or to reduce the load, this intermingling being permitted in the present organization owing to the fact that such intermingling is not with the load itself, but with a part thereof previously discharged from the load-receiver.

I claim as my invention—

1. In a weighing-machine, the combination, with automatically-effective material-supply means, of a weighing instrumentality operative to weigh the material, and load-reducing means comprising means for applying a flowable substance to the material received by said weighing instrumentality thereby to treat the same to reduce the load and permit the weighing of the true load.

2. In a weighing-machine, the combination, with an automatically-effective material-supply means, of a weighing instrumentality operative to weigh the material; load-reducing means comprising means operative to discharge a substance into engagement with the material to be reduced thereby to reduce the same and permit the weighing of the true load and means for arresting the discharge of such substance on the poising of the load.

3. In a weighing-machine, the combination, with an automatically-effective material-supply means, of a weighing instrumentality operative to weigh the material, and automatically-operative load-reducing fluid-applying means effective to apply a fluid to the material to be reduced thereby to reduce such material and permit the weighing of the true load.

4. In a weighing-machine, the combination, with an automatically-effective load-supply means, of a weighing instrumentality operative to weigh the material; load-reducing means comprising a blast-applying device effective to apply a blast to the material to be reduced thereby to reduce the load and permit the weighing of the true load, and automatically-operative valve mechanism for controlling said load-reducing means.

5. In a weighing-machine, the combination, with a weighing instrumentality including a load-receiver, of means located within said receiver for directing a stream of material from one part thereof to another part of said receiver, and load-reducing means effective to apply a stream of material to said first stream, thereby to reduce the load and permit the weighing of the true load.

6. In a weighing-machine, the combination of a weighing instrumentality effective to weigh material; load-reducing means operative to apply a flowable substance into contact with the material to be reduced thereby to reduce the load and permit the weighing of the true load; and automatically-effective load-discharging means.

7. The combination of weighing mechanism embodying a load-receiver, load-supply means, and load-reducing means supported independently of said receiver and effective for discharging a part of the material away from said receiver by the application thereto of a flowable substance thereby to permit the weighing of the true load; and means for controlling the operation of said load-reducing means.

8. In a weighing-machine, the combination of poising mechanism including a load-receiver; load-supply means therefor; and load-reducing means supported independently of the poising mechanism and effective to reduce the load by imparting movement to a portion thereof such as will carry it from the receiver, and controlled in its operation by a part of such poising mechanism.

9. In a weighing-machine, the combination of a load-receiver; load-supply means therefor; and load-reducing means supported independently of said load-receiver and effective to reduce the load by imparting movement to a portion thereof such as will carry it from the receiver, and controlled in its operation by a part of said machine.

10. In a weighing-machine, the combination of a load-receiver having load-discharging means; overload-supply means therefor; and load-reducing means supported independently of said receiver and effective to force a part of the material therefrom by the action of a flowable substance, thereby to permit the weighing of the true load.

11. In a weighing-machine, the combination of a weighing instrumentality operative to receive and weigh material; means for separating one part of the material from another part thereof while flowing into said weighing instrumentality; and means for applying a flowable substance to one part of said material thereby to reduce the load and permit the true load to be ascertained.

12. In a weighing-machine, the combination of weighing mechanism embodying a load-receiver; load-supply means therefor; load-reducing means operative at one side of said receiver to discharge a flowable substance into contact with the matter to be reduced and thereby permit the weighing of the true load; and load-discharging means operative at another side of said receiver.

13. In a weighing-machine, the combination of weighing mechanism embodying a load-receiver; overload-supply means therefor; load-reducing blast-applying means operative at one side of said receiver to reduce the overload and thereby permit the weighing of the true load; means for arresting the discharge of the blast on the poising of the load; and load-discharging means operative at another side of said receiver to discharge the load.

14. In a weighing-machine, the combination of weighing mechanism embodying a load-receiver; load-supply means therefor; load-reducing stream-applying means supported independently of said receiver and operative at one side thereof to convey a stream of material into engagement with the material to be reduced and thereby permit the weighing of a true load; and load-discharging means operative at the opposite side of said receiver to discharge the load.

15. In a weighing-machine, the combination of weighing mechanism; material-supply means therefor; and automatically-controlled load-reducing means, embodying a conduit, operative to convey matter into position to act on the material of the load, thereby to reduce such load and permit the weighing of the true load.

16. In a weighing-machine, the combination of a load-receiver; overload-supply means therefor; and automatically-effective load-reducing means, embodying a conduit, operative to convey matter into position to act on the overload thereby to reduce such overload and permit the weighing of the true load, and controlled in its operation by said receiver.

17. In a weighing-machine, the combination of weighing mechanism; load-supply means therefor; automatically-effective load-reducing blast-applying means operative to apply a blast, thereby to reduce the load and permit the weighing of the true load; and means for controlling the operation of said load-reducing means.

18. The combination of weighing mechanism; load-reducing blast-applying means effective to apply a blast, thereby to reduce the load; and means for controlling the operation of said load-reducing means, and controlled in its operation by a part of said weighing mechanism.

19. In a weighing-machine, the combination of weighing mechanism; load-supply means therefor; a load-reducing, blast-applying device effective to apply a blast to reduce the load and thereby permit the weighing of the true load; and means for cutting off said blast during the weighing operation.

20. The combination of weighing mechanism; load-supply means therefor; a load-reducing blast-applying device effective to apply a blast to reduce the load; and a valve for cutting off said blast, and controlled in its operation at one predetermined period by a part of the weighing mechanism.

21. The combination of a load-receiver operative to weigh a load; overload-supply means therefor; a load-reducing blast-applying device effective to apply a blast to reduce the load; and a valve for cutting off said blast, and controlled in its operation at one predetermined period by said load-receiver.

22. In a weighing-machine, the combination of weighing mechanism; load-supply means therefor; a load-reducing blast-applying device effective to apply a blast to reduce the load and permit the weighing of the true load; and a weighted device for controlling the operation of said load-reducing device.

23. The combination of weighing mechanism; load-supply means therefor; and a load-reducing blast-applying device effective to apply a blast to reduce the load; and a weighted device for controlling said blast, and controlled at one period by a part of said weighing mechanism.

24. The combination of a load-receiver operative to weigh a load; overload-supply means therefor; a load-reducing blast-applying device effective to apply a blast to reduce the load; and a weighted valve for controlling said blast, and controlled at one period by its weight and at another period by the load-receiver.

25. In a weighing-machine, the combination of weighing mechanism embodying a load-receiver having a neutral region and operative to discharge a stream of material through said region; a load-reducing blast-applying device effective to apply a blast to said material-stream during its passage through said region thereby to reduce the load and permit the weighing of the true load and means for arresting the blast on the poising of the load.

26. In a weighing-machine, the combination of weighing mechanism embodying a load-receiver having a main compartment and a pair of supplemental compartments each communicating with said main compartment, and a neutral region intermediate thereof, one of said compartments operative to discharge a stream of material into said neutral region, and the other compartment adapted to receive material therefrom; and a load-reducing blast-applying means operative to apply a blast to the stream during its passage through said neutral region and thereby permit the weighing of the true load.

27. In a weighing-machine, the combination of weighing mechanism embodying a load-receiver having a main compartment and a pair of supplemental compartments, one communicating with said main compartment adjacent to the top thereof, and the other communicating with the main compartment adjacent to the bottom thereof; a neutral region intermediate said supplemental compartments, one supplemental compartment being effective to discharge a stream of material into said neutral region, and the other supplemental compartment adapted to receive material from said neutral region; and a fluid-applying means effective to apply a fluid to the material during its passage through said neutral region thereby to reduce the load and permit the weighing of the true load.

28. In a weighing-machine, the combination, with load-supply means, of weighing mechanism embodying a load-receiver having a main compartment, a supplemental compartment, and a neutral region communicating with said main compartment and with said supplemental compartment; and a blast-applying means operative to apply a blast to the material discharged into said neutral region to reduce the load supplied to said receiver, and controlled in its operation at one predetermined period by a part of the weighing-machine.

29. The combination of weighing mechanism embodying a load-receiver having a neutral region communicating with said load-receiver to permit material to be discharged thereinto, and having a pair of openings; and load-reducing means projecting through one of the openings of said neutral region and operative to force material during its passage through said neutral region out of the other opening thereof.

30. The combination, with load-supply means, of weighing mechanism having a load-receiver provided with an opening at one side thereof, a main compartment, a supplemental compartment, and a neutral region below said supplemental compartment and communicating with the opening at one side of said receiver and also with the main compartment thereof, said supplemental compartment being effective to discharge a stream of material into said neutral region, from which it may flow into said receiver; and load-reducing means operative by impact in said neutral region for forcing the material out of said opening at the side of said receiver and without the carriage of such material therefrom in a receptacle.

31. The combination of weighing mechanism embodying a load-receiver having a main compartment and a pair of supplemental compartments communicating therewith and with each other by a neutral region; a conduit; a spout carried by said receiver and projecting into said conduit and movable relatively thereto; and means operative to reduce the load and convey the surplus thereof through said spout into said conduit.

32. The combination of weighing mechanism embodying a load-receiver having a neutral region communicating therewith; a stream receiver or conduit; a conduit carried by one of said receivers and projecting into the other; and means operative to reduce the load and convey the surplus thereof through said last conduit into the stream-receiver.

33. The combination of weighing mechanism embodying a load-receiver; a conduit provided with an opening at one side thereof; a spout carried by said receiver and projecting through said opening and carrying a closer for said opening; and load-reducing means operative to reduce the load and have the surplus thereof pass through the spout into said conduit.

34. In a weighing-machine, the combination of weighing mechanism embodying a load-receiver operative to receive material and to separate a part thereof as a stream, and blast-applying means operative to apply a blast to the stream thereby to effect the operation of the weighing mechanism and permit the weighing of the material unacted upon by said blast and load-discharging means.

35. In a weighing-machine, the combination of weighing mechanism having a load-receiver adapted to receive material and constituting the field of influence and operative to discharge a portion of such material from said field of influence into a field of non-influence, and means for applying a flowable substance to such material while in the field of non-influence thereby to reduce the material and permit a portion of such material passing through the field of non-influence to be again received by the same field of influence and constitute a part of the same load.

36. In a weighing instrumentality, the combination of weighing mechanism; means for supplying material thereto; means for transferring a portion of such material from one part of a weighing mechanism through a neutral region to another part thereof, and means for reducing such material while in said neutral region by the application of matter thereto of a nature to intermingle and be discharged therewith and thereby permit the true load to be ascertained.

37. In a weighing instrumentality, the combination of weighing mechanism; means for supplying material thereto; and means for reducing such material by the impact of a flowable substance directed to a part thereof whereby such material is reduced to a predetermined quantity determined by the rising of such reduced material to a poising condition preparatory to its final disposition or discharge.

38. In a weighing-machine, the combination, with weighing mechanism comprising a load-receiver, and counterbalancing means comprising a float, of material-supply means for said weighing mechanism, and means for applying a flowable substance to act by impact on a part of the material, thereby to reduce the load and permit the true load to be weighed.

39. In a weighing-machine, the combination, with weighing mechanism embodying a load-receiver having counterbalancing means comprehending a fluid-displacer, of load-supply means for the receiver; load-reducing blast-applying means effective to apply a blast to the material to be reduced, thereby to reduce the load and permit the true load to be weighed and means for arresting the blast on the reduction of the load.

40. In a weighing-machine, the combination, with a load-receiver, of a tank below the same, and fluid-displacing counterbalancing means disposed in said tank and having a linkage connection therewith, and also having a connector adjustably secured to the under side of said receiver, said fluid-displacing means being effective as a counterbalancing means and also as a supporting means for the receiver.

41. The combination of the poising elements of a rising-poise weighing-machine comprising a beam and a load-receiver; a stop carried by one of said poising elements; and a toggle supported in position to have one link of said toggle engage said stop and limit said poising elements on rising intermediate their poising and normal load-receiving positions and until the complete discharge of the load from said load-receiver.

42. The combination of a rising-poise weighing mechanism embodying a load-receiver, and a toggle supported independently of said receiver, one part of said toggle directly engaging a part of the receiver to limit the rising thereof intermediate its poising and normal load-receiving positions and until the complete discharge of the load from the load-receiver.

43. The combination, with framework, of rising-poise weighing mechanism including a load-receiver having a closer; a depending toggle carried by said framework an engaging part carried on said receiver the two organized for limiting the movement of said receiver in an upward direction and until the complete discharge of the load from said load-receiver; and means for throwing said toggle mechanism into its inoperative position on the shutting of said closer.

44. The combination of weighing mechanism embodying a load-receiver having closer mechanism; load-supply means therefor; stream-controlling means for regulating such supply and operatively controlled by the weighing mechanism; means free of connection with the stream-controlling means for preventing the operation thereof by the weighing mechanism during a predetermined period; and means operated by said closer mechanism for rendering said limiting means ineffective.

45. The combination of weighing mechanism embodying a load-receiver having a closer; load-supply means therefor; stream-controlling means for regulating the supply and operatively controlled by the weighing mechanism; weighted means free of connection with the stream-controlling means for preventing the operation of said stream-controlling means by the weighing mechanism during a predetermined period and thrown into one position by its weight at one period and into another position at another period by said closer mechanism.

46. The combination of the poising elements of a weighing-machine comprising a beam and a load-receiver; overload-supply means embodying stream-controlling means operative by said poising elements; means for reducing the surplus of the load thereby to permit the rising of said load-receiver to a poising position; a stop carried by one of said poising elements; and a toggle in position to have one link thereof engage said stop and limit the movement of said poising elements after the operation of said load-reducing means and until the complete discharge of the load, and thereby prevent the operation of the stream-controlling means until such discharge of the load.

47. The combination of weighing mechanism embodying a load-receiver; load-supply means embodying stream-controlling means controlled by said receiver; and toggle mechanism for limiting the movement of said receiver during a predetermined period, thereby to prevent the opening of the stream-controlling means, and comprising two devices one carried by the load-receiver and the other free of connection with said load-receiver and with the stream-controlling means.

48. The combination of poising mechanism comprising a beam and a load-receiver having a load-discharger; load-supply means embodying stream-controlling means controlled by said poising mechanism; a stop carried by said poising mechanism; a toggle in position to have one link thereof engage said stop and limit the movement of the receiver until a predetermined period and thereby prevent the opening of the stream-controlling means; and means operative by the load-discharger for actuating said toggle to permit the movement of said receiver and the opening of the stream-controlling means.

49. The combination of poising mechanism; means comprising a stop member and a free-ended toggle member, one of said members carried on said poising mechanism and the other carried free thereof, said toggle member being effective to engage said stop member and arrest the movement of said poising mechanism; and load-discharging means effective to operate said toggle member and permit the movement of said poising mechanism.

50. The combination, with framework, of weighing mechanism supported thereby and embodying a load-receiver having a stop carried thereby, and a closer; a toggle carried by said framework and operative to engage said stop and arrest the movement of said receiver during a predetermined period; and means carried by said closer for unlocking said toggle, thereby to permit the movement of said load-receiver.

51. The combination of weighing mechanism including a load-receiver having a stop carried thereby; load-discharging means therefor; a toggle supported in position and operative to engage said stop and arrest the movement of said receiver during a predetermined period; and means operative by said load-discharging means for unlocking said toggle, thereby to permit the movement of said load-receiver.

52. In a weighing-machine, the combination of weighing mechanism including a load-receiver and counterbalancing means; means independent of said counterbalancing means for retarding the descending movement of said weighing mechanism; and means for arresting, during a predetermined period, the ascending movement of said weighing mechanism toward its load-receiving position.

53. In a weighing-machine, the combination of weighing mechanism including a load-receiver and counterbalancing means; adjustable means independent of said counterbalancing means for retarding the descending movement of said weighing mechanism; and means for arresting, during a predetermined period, the ascending movement of said weighing mechanism toward its load-receiving position.

FRANCIS H. RICHARDS.

Witnesses:
 FRED. J. DOLE,
 C. A. WEED.